US008595947B2

(12) United States Patent
Cade (10) Patent No.: US 8,595,947 B2
(45) Date of Patent: Dec. 3, 2013

(54) PLUMB DEVICE FOR CONSTRUCTING BRICK COLUMNS (76) Inventor: Calvin Eugene Cade, Florence, SC (US)

( * ) Notice: Subject to any disclaimer, the term of this patent is extended or adjusted under 35 U.S.C. 154(b) by 215 days.

(21) Appl. No.: 13/373,049

(22) Filed: Nov. 3, 2011

(65) Prior Publication Data
US 2013/0111771 A1 May 9, 2013

(51) Int. Cl.
G01C 15/10 (2006.01)
(52) U.S. Cl.
USPC .................................. 33/392; 33/404; 33/409
(58) Field of Classification Search
USPC ........................................ 33/392, 404–410
See application file for complete search history.

(56) References Cited

U.S. PATENT DOCUMENTS

| 663,975 | A | * | 12/1900 | McClellan et al. ............. 33/370 |
| 2,503,098 | A | | 4/1950 | Crocker |
| 2,641,846 | A | * | 6/1953 | Zeno ............................... 33/406 |
| 2,672,691 | A | | 3/1954 | Sears et al. |
| 2,685,741 | A | | 8/1954 | Wilkinson |
| 2,769,240 | A | * | 11/1956 | Wells ............................... 33/410 |
| 3,250,009 | A | | 5/1966 | Oseka |
| 3,768,167 | A | * | 10/1973 | Viau ............................... 33/406 |
| 3,977,088 | A | | 8/1976 | Bondi |
| 4,144,649 | A | * | 3/1979 | Huston ........................... 33/409 |
| 4,442,610 | A | | 4/1984 | Owens, Jr. |
| 4,459,761 | A | | 7/1984 | Bosco |
| 4,569,179 | A | | 2/1986 | Post |
| 4,631,833 | A | | 12/1986 | Moye |
| 4,674,188 | A | | 6/1987 | Fisher |
| 4,995,167 | A | | 2/1991 | Sanchez |
| 5,129,150 | A | * | 7/1992 | Sorensen ........................ 33/408 |
| 5,136,785 | A | | 8/1992 | Shirley |
| 5,157,843 | A | | 10/1992 | Barcewski |
| 5,274,929 | A | | 1/1994 | Tocci |
| 5,479,713 | A | | 1/1996 | Wood |
| 5,915,809 | A | | 6/1999 | Gilliam |
| 5,933,974 | A | | 8/1999 | Walters et al. |
| 6,430,826 | B1 | | 8/2002 | Sigl |
| 6,763,599 | B2 | | 7/2004 | Deshevy |
| 6,857,234 | B2 | | 2/2005 | Goudreau et al. |
| 6,860,024 | B2 | * | 3/2005 | Kirk ............................... 33/405 |
| 7,055,256 | B2 | | 6/2006 | Alecci |
| 7,320,181 | B2 | | 1/2008 | Charpentier |
| 7,587,833 | B2 | | 9/2009 | Bittner et al. |
| 7,631,435 | B2 | | 12/2009 | Brown |
| 7,730,626 | B2 | | 6/2010 | Charpentier |
| 8,511,041 | B2 | * | 8/2013 | Fransen ......................... 33/406 |
| 2001/0039741 | A1 | * | 11/2001 | Kirk ............................... 33/408 |
| 2013/0111771 | A1 | * | 5/2013 | Cade ............................... 33/392 |

* cited by examiner

Primary Examiner — Yaritza Guadalupe-McCall (57) ABSTRACT

A device for constructing plumb brick columns includes: (a) a base suspension portion including: a base, a base pole, and a substantially L-shaped swing arm movably attached to the base pole; (b) a hanger mechanism, including a hanger rod attached to a center of the upper template, and to a hanger clamp that is affixable around the swing arm; and (c) a suspended template portion including: (1) an upper template; (2) a same-sized, removable lower template below the upper template; and (3) vertical guide lines, each extending between a corner of the upper template and a corresponding corner of the lower template, each corner of the lower template including a line attachment device attachable to a corresponding attachment device on a lower end of each guide line. This simplified abstract is not intended to limit, and should not be interpreted as limiting, the scope of the claims.

20 Claims, 12 Drawing Sheets

PLUMB DEVICE FOR CONSTRUCTING BRICK COLUMNS

BACKGROUND OF THE INVENTION

1. Technical Field

The present invention relates to a device for laying plumb freestanding or supporting brick columns and other block columns.

2. Background Information

Though it is not hard to build a square brick freestanding column, it is very difficult and time consuming to build a straight, aesthetically pleasing column. Masons and contractors are well aware of this frustrating problem. Most contractors and homeowners will require that a crooked column be torn down and rebuilt, and the conscientious bricklayer will want to do so. Masonry students in particular hate to have to stop laying bricks repeatedly in order to plumb with a traditional level nine or more times per course of bricks as they attempt to build a straight freestanding column. They are apt to become bored and frustrated with the work.

It is difficult to keep a brick column plumb. The individual bricks tend to twist, and brick columns tend to lean more the higher they are. The problem is exacerbated by the new old trend toward building with reclaimed (used) bricks, which are said to have a vintage, more aesthetically pleasing appearance, but which are even more difficult to work with than new bricks.

The plumb device, and the template device, of the present invention enables even students to lay straight and true columns. With the present plumb device, the masonry student no longer has to repeatedly stop laying bricks in order to plumb each course of bricks many times. Elimination of this task means fewer bored students, and a greater number of confident, alert bricklayer students. The time required to build a column is greatly reduced, which translates to labor savings, and the product is straight and pleasing in appearance. The present plumb device also makes it easier to build using reclaimed brick.

Other advantages of the plumb device of the present invention include the following: 1) the present plumb device is a reusable, reliable, and inexpensive tool; 2) using the present plumb device, the mason can work freely around the column as he builds it; 3) a column can be built on unlevel ground using the present plumb device, which is "self-plumbing"; 4) the present plumb device can be used to build short or tall columns (e.g., 2-10 feet tall), and the position of the device's swinging arm can optionally be reversed for building even higher columns; 5) various templates of the present plumb device may be selected and guide lines can be added for building different column shapes; 6) the present plumb device includes line attachment devices on the upper templates, so there is no guessing required about where to place the guide lines, which is particularly helpful for the student mason; 7) the plumb device can be used for constructing two or more straight columns simultaneously using the device swing arm; and 8) since all sides of the column being built can be seen at once, any mistakes can more easily be pinpointed using the present "3-D plumbing" device and corrected. These advantages are also true of the template device portion of the present invention.

BRIEF SUMMARY OF THE INVENTION

The present invention is a device for laying plumb freestanding columns made of brick or the like, which comprises: (a) a base suspension portion comprising: a base, a substantially vertical base pole supported on the base, and a swing arm movably attached to an upper end of the base pole; (b) a hanger mechanism, comprising a hanger rod comprising a lower end portion connected through a center of the upper template, and a hanger adjustment wing nut affixed to the lower end portion of the hanger rod below the upper template, an upper end of the hanger rod being attached to a hanger clamp, the hanger clamp being affixable around the swing arm; and (c) a suspended template portion comprising: (1) an upper template; (2) a removable lower template below and spaced apart from the upper template, the upper template being the same size as the lower template; and (3) a plurality of vertical guide lines, each guide line extending between a corner of the upper template and a corresponding corner of the lower template, each corner of the lower template comprising a line attachment device attachable to a corresponding attachment device on a lower end of each guide line. A template device for laying brick columns that are not freestanding is also included.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

In the following description, like reference characters designate like or corresponding parts throughout the several views. Also, in the following description, it is to be understood that such terms as "front," "beneath," "lower," and the like are words of convenience and are not to be construed as limiting terms. Referring in more detail to the drawings, a device embodying the principles and concepts of the present invention and generally designated by the reference numeral 10 will now be described.

Referring to FIGS. 1 through 6, the plumb device 10 is intended for use in the construction industry for assisting a mason in laying freestanding brick columns or the like. The plumb device 10 is intended for use in erecting freestanding columns along driveways and around pools and property lines, for gates or gateways, for mailboxes and columns for supporting lights, etc. The plumb device 10 is especially helpful for helping the inexperienced masonry student to build true columns.

The plumb device 10 includes: (a) a base suspension portion 11; (b) a hanger mechanism 24; and (c) a suspended template portion 12 suspended from the base suspension portion 11. In regard to the first, the base suspension portion 11 includes: (1) a base 13, preferably a substantially horizontal base plate, (2) a substantially vertical base pole 14 supported on the base 13, and (3) a substantially L-shaped swing arm 15 movably attached to an upper end 18 of the base pole 14.

Figure 1:
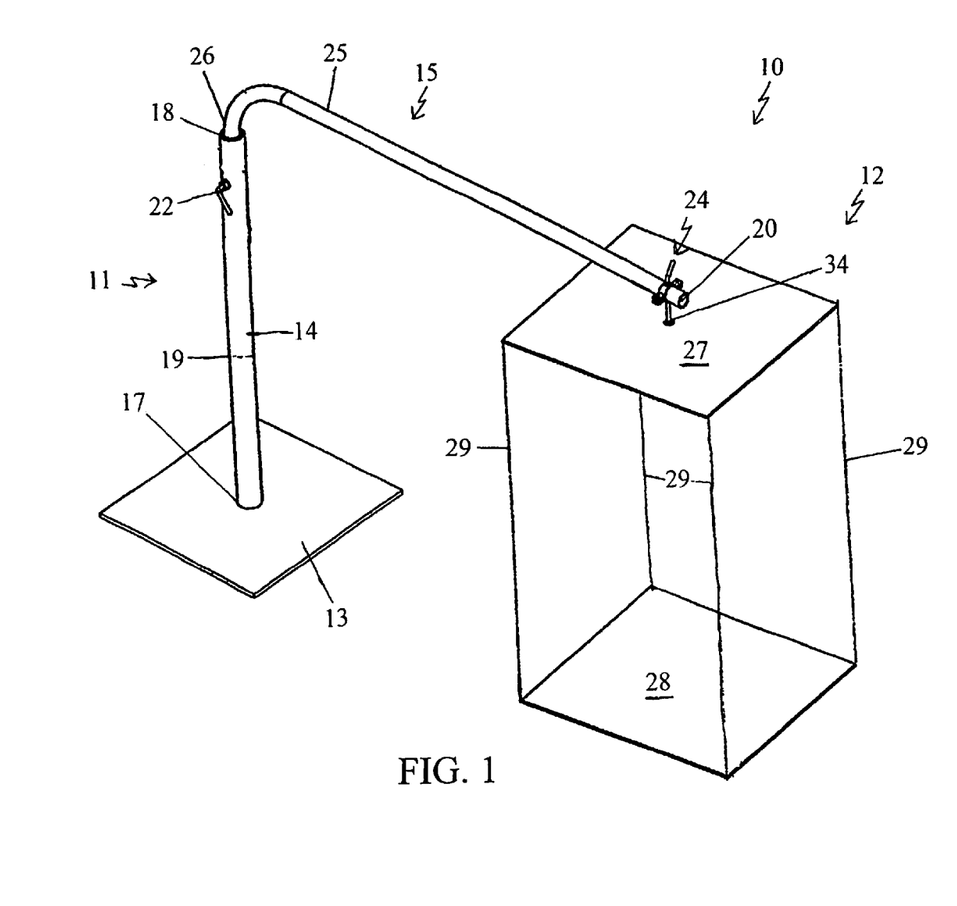
FIG. 1 shows a perspective view of a plumb device according to the present invention.

First, the base plate 13 of the base suspension portion 11 is preferably a substantially rectangular (includes square), substantially planar, rustproof metal plate placed on the ground adjacent the planned location of the freestanding brick column 16. The area of ground on which the brick column 16 is to be built need not be perfectly flat because the plumb device 10 is "self-plumbing"; since the suspended template portion 12 hangs, whether or not the freestanding column 16 is plumb is not dependent on the contours of the ground. The plumb device 10 works, or plumbs, regardless of how level the ground 49 is in the area of the base plate 13 or where the freestanding column 16 is being built. The base suspension portion 11 is freestanding; the plumb device 10 is not attached to a wall or other supporting structure.

Secondly, the lower end 17 of the base pole 14 is attached to the base 13, preferably to a center of a base plate. Removable base weights 21, such as sand bags, are placed on the upper surface of the base plate 13 if they are needed in order to hold the base suspension portion 11 in place during windy conditions, etc.

Thirdly, the base pole 14 is preferably hollow with an open upper end 18 into which a first, lower end 19 of the substantially L-shaped swing arm 15 telescopes. Alternatively, a hollow first, lower end 19 of the swing arm 15 slides over the upper end 18 of the base pole 14. The slide of the swing arm 15 over the base pole 14, or vice versa, is arrested by a pole adjustment mechanism 22. Alternatively and less preferably, the upper end 18 of the base pole 14 is attached to, or continuous with, the first end 19 of the swing arm 15. Lastly, the base pole 14 itself may include two pole sections that telescope into one another, permitting pole height to be adjusted.

Figure 4:
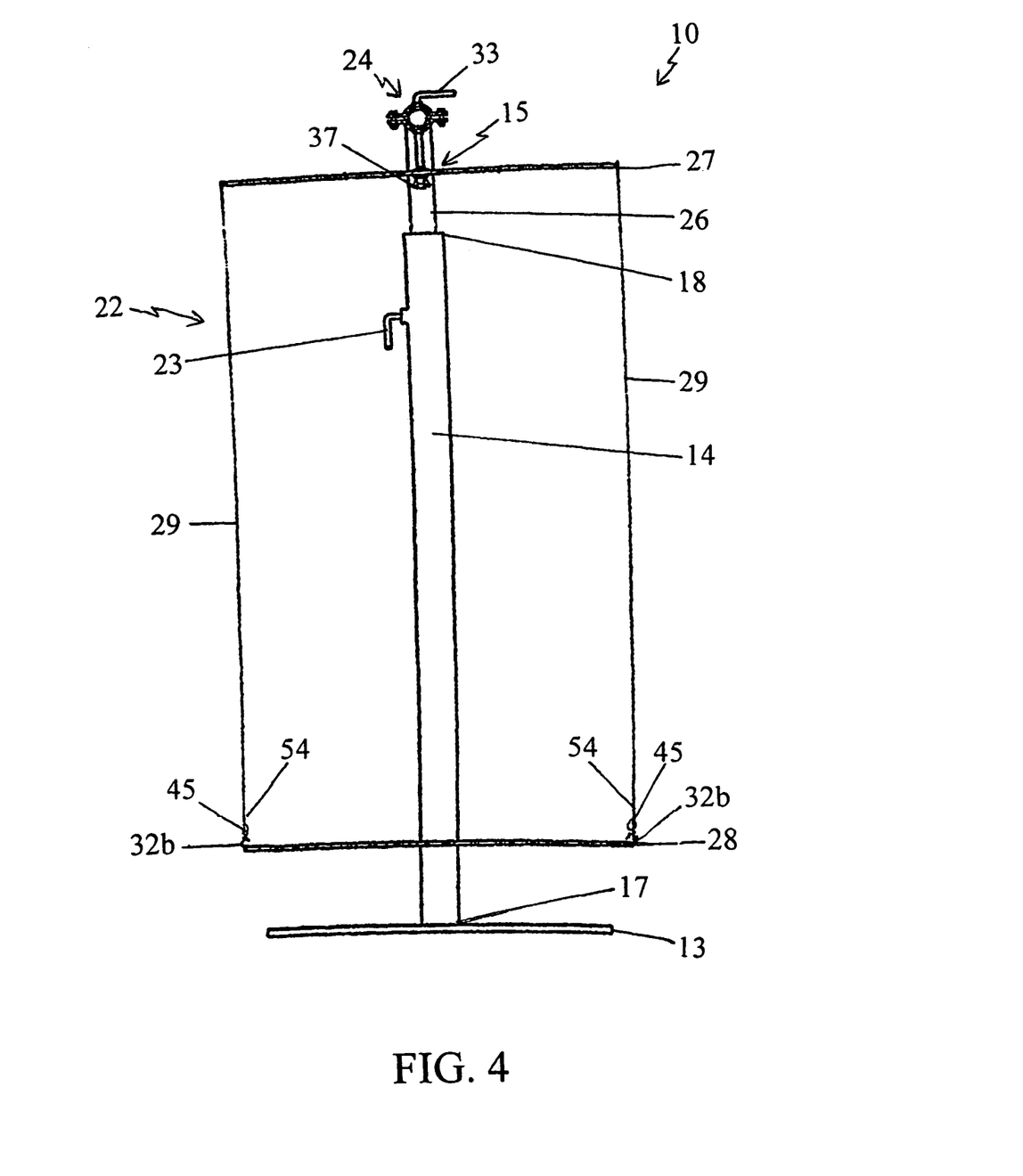
FIG. 4 is a front elevational view of a plumb device according to the present invention.
Figure 7:
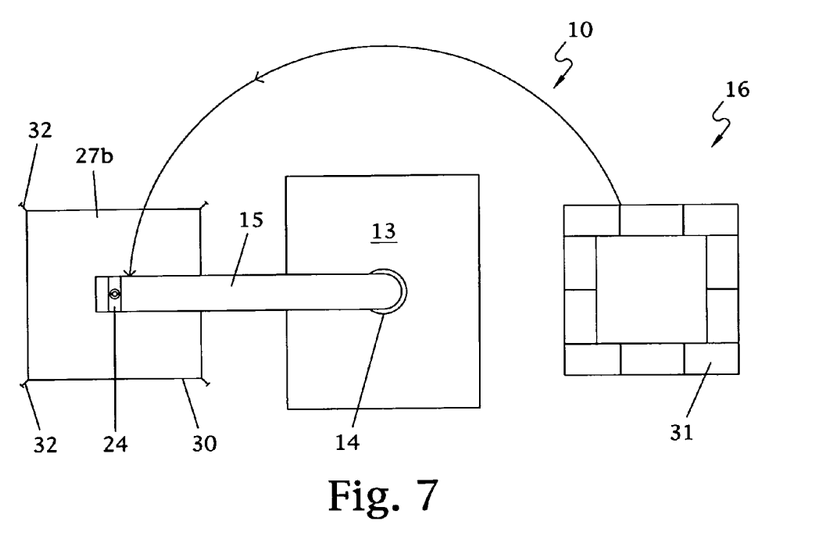
FIG. 7 is a schematic top plan view of a plumb device according to the present invention, shown in use on two brick columns.
Figure 11:
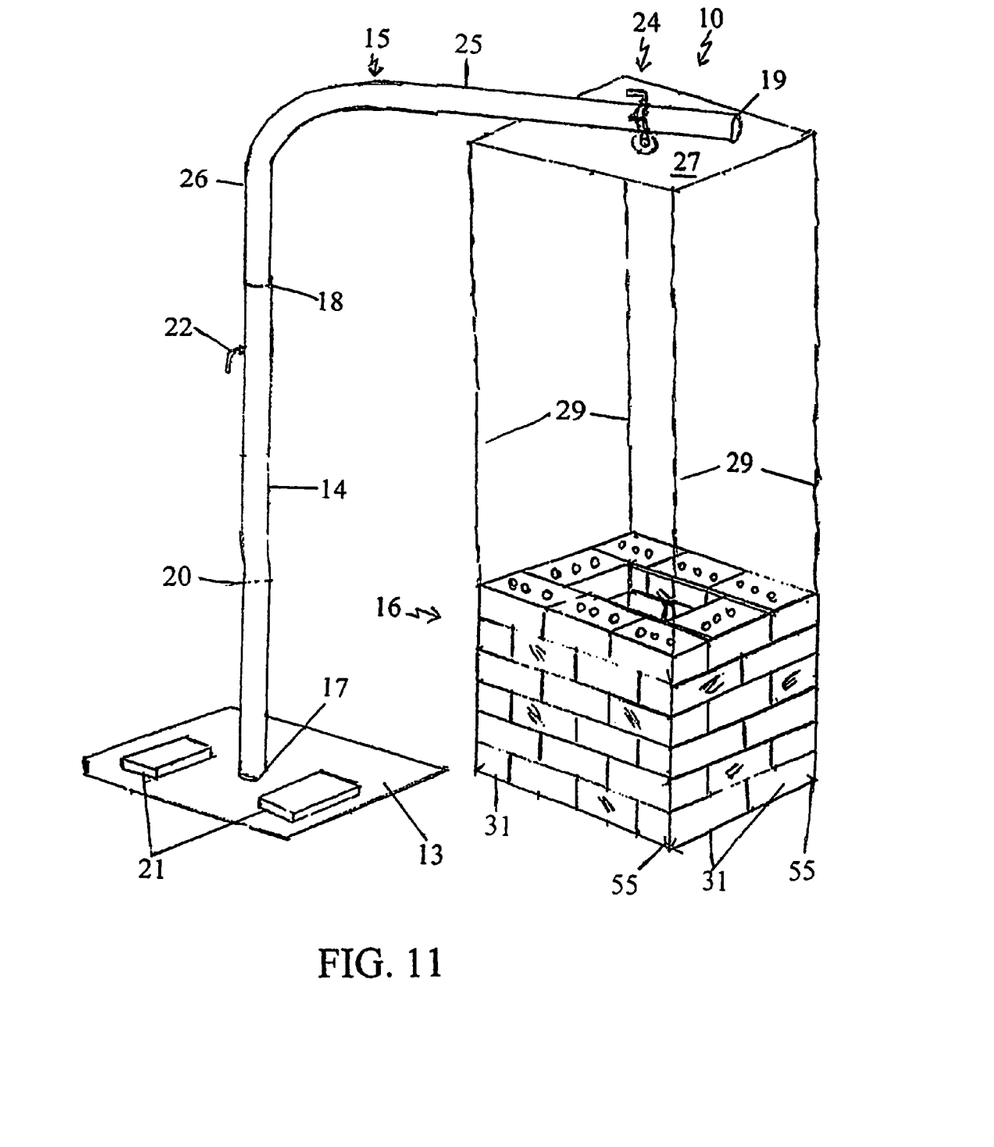
FIG. 11 is a front perspective view of a plumb device according to the present invention, shown in use.

As seen in FIGS. 1, 4 and 11, the cylindrical first arm end 19 is rotatable in the cylindrical, hollow upper pole end 18, with the amount of rotation controlled by the user. The first arm end 19 portion, and the free, second arm end 20 portion, fit closely into the cylindrical, hollow upper pole end 18. The swing arm 15 is capable of swinging 360 degrees around the base pole 14. This swing arm rotation permits the plumb device 10 to be used for building two or more straight columns 16 simultaneously or sequentially without having to move the plumb device 10. With the swing arm 15 in a first position, a first column 16 is begun. The same mason or a second mason then swings the swing arm 15 to the second area, as seen in FIG. 7, which has been chosen ahead of time for the second column, and begins building it. Thus, as seen in FIG. 7, the same plumb device 10 is used for building two columns 16. The plumb device of FIG. 7 has been used to build a first brick column 16. The swing arm 15 is then swung in an arc 180 degrees and a second column is built in the same manner. A square template 27b is shown in FIG. 7, but the templates may be any desired shape. A light, decoration, platform, or statue can be placed atop each brick column, if desired.

If desired, a third position can be selected for building a third column at a different site along the 360 degree arc of the swing arm 15, and so forth. The second and third columns are identical to the first column where, for example, the columns have a square or rectangular base. The columns 16 are made of brick, cement blocks, or the like.

Figure 12:
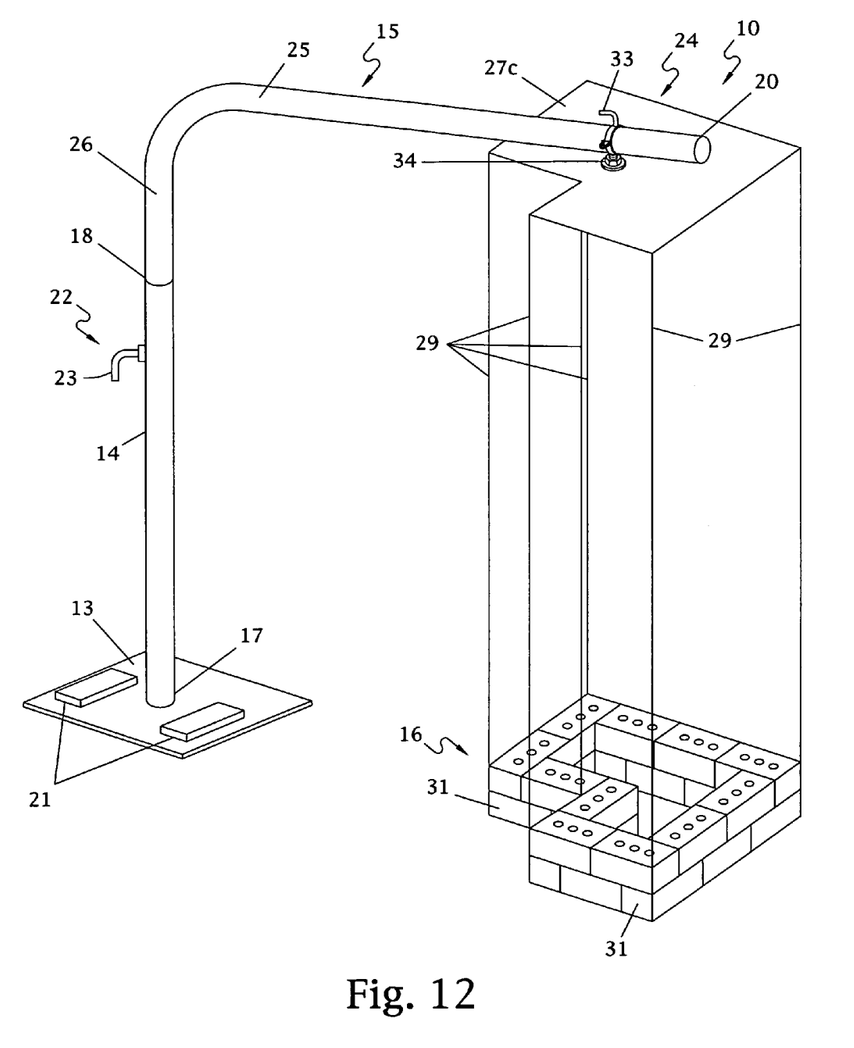
FIG. 12 is a front perspective view of a plumb device according to the present invention, shown in use.

Alternatively, the suspended template portion 12 on its hanger mechanism 24 is rotated on the swing arm 15 for constructing the second column, so that the second column is a mirror image of the first column once they are built. To do this, the hanger clamp 35, with the rest of the hanger mechanism 24 and the suspended template portion 12 suspended from it, is pulled off the free end of the swing arm 15, turned 180 degrees, and replaced on the swing arm. Mirror image columns would be suitable, for example, as L-shaped columns (see FIG. 12) on opposite sides of a driveway or gate.

Figure 3:
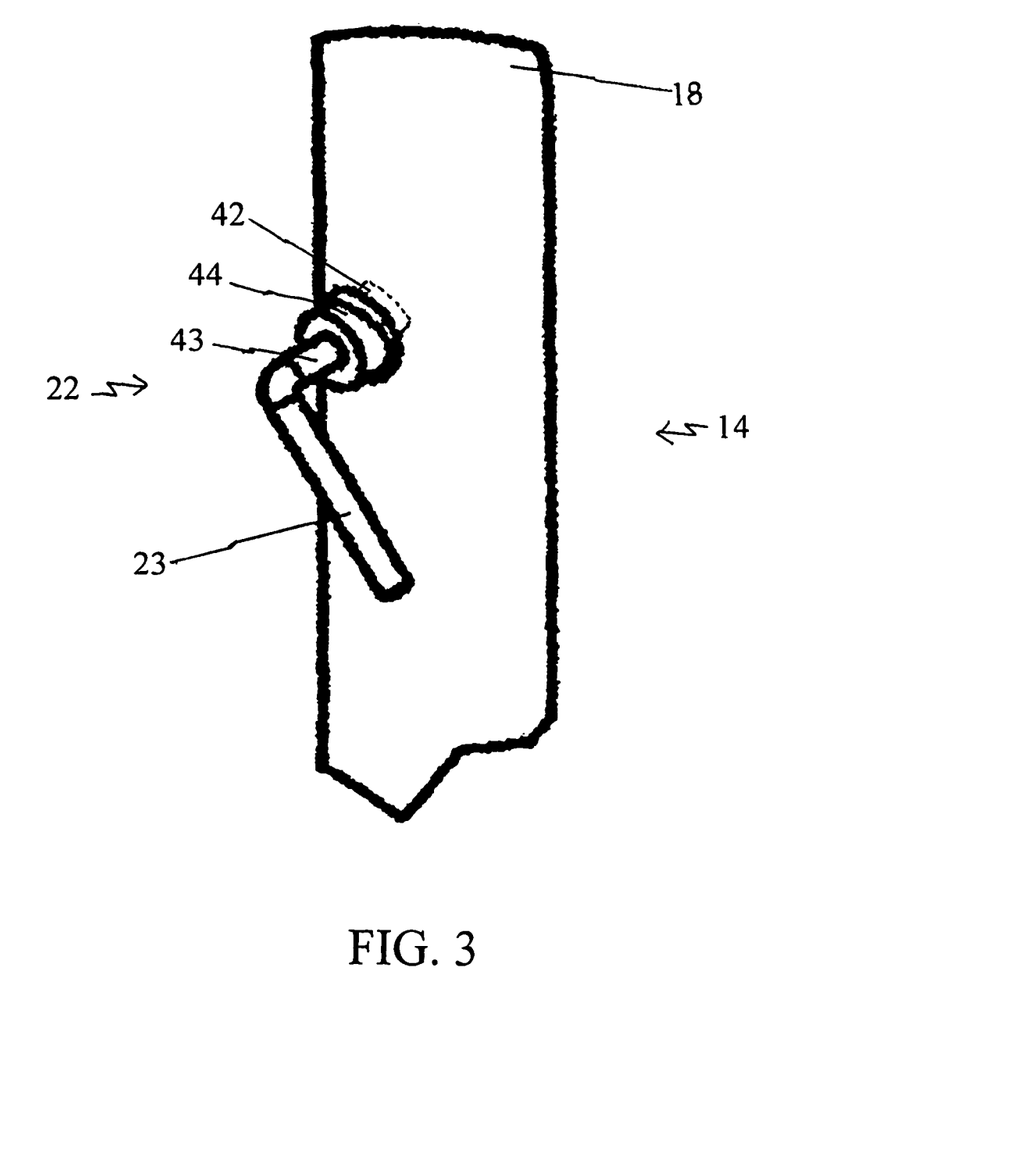
FIG. 3 is a perspective view of the pole adjustment mechanism of the plumb device according to FIG. 1.

As seen in FIGS. 1 and 3, the pole adjustment mechanism 22 includes a substantially L-shaped height adjustment handle 23 with a bottom leg 43 having a bottom end portion 42 that extends through a pole tightening screw 44 and through a hole in the side of the pole 14 near the upper end 18 of the base pole 14. The height adjustment handle 23 is usually between about four and five feet from the ground, where it can easily be reached by the user. The bottom end 42 of the bottom leg 43 of the height adjustment handle 23 contacts the side of the substantially vertical leg 25 or 26 of the swing arm 15. When the adjustment handle 23 is its closed position, the pole tightening screw 44 holds the swing arm 15 in position, maintaining the selected height of the pole assembly. The swing arm 15, the substantially horizontal leg of which is generally parallel to the ground 49, is preferably about seven or eight feet high so that construction workers are unlikely to inadvertently strike their heads on it.

To lower the vertical height of the pole assembly (the pole 14 and the adjacent, substantially vertical leg of the swing arm 15), the pole adjustment handle 23 is pushed to its open position, which loosens the pole tightening screw 44 until the vertical leg of the swing arm 15 falls the desired amount down into the close fitting hollow pole end 18. The pole adjustment handle 23 is then pushed back to the closed position, which tightens the pole tightening screw 44. The height of the pole assembly is normally lowered when the plumb device 10 will be used to construct a shorter column (e.g., 4-6 feet tall).

In general, the height of the pole assembly is raised when a tall column is to be built. A ladder may be required to lay the uppermost brick courses in a tall column (e.g., ten feet high). To raise the height, the pole tightening screw 44 is loosened by turning the adjustment handle 23. Whichever leg of the swing arm 15 is substantially vertical is hoisted up to its desired height, and the pole tightening screw 44 is tightened again by turning the adjustment handle 23 in the reverse direction.

Secondly, as seen in FIGS. 1, 2, 5, and 6, the plumb device 10 includes a hanger mechanism 24 at the free, second end 20 of the swing arm 15. The hanger mechanism 24 includes a hanger rod 35 or bolt including a lower rod end portion 46 attached to a center of the lower template 28, an upper rod end 47 of the hanger rod 36 being welded to the bottom of a split hanger clamp 35 that is removably affixed around the swing arm 15. The split hanger clamp 35 clamps over the (free) end portion of whichever leg of the swing arm 15 is horizontal.

Figure 2:
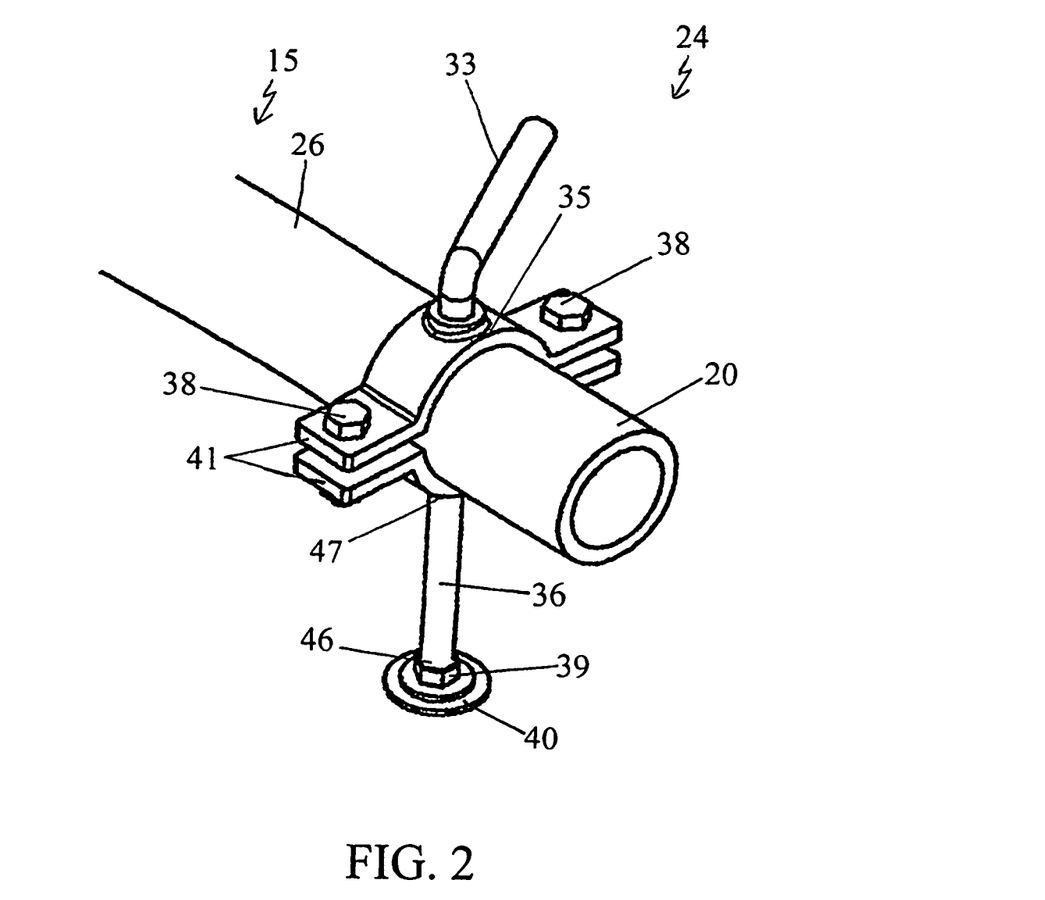
FIG. 2 is a perspective view of a hanger mechanism of the plumb device according to FIG. 1.
Figure 5:
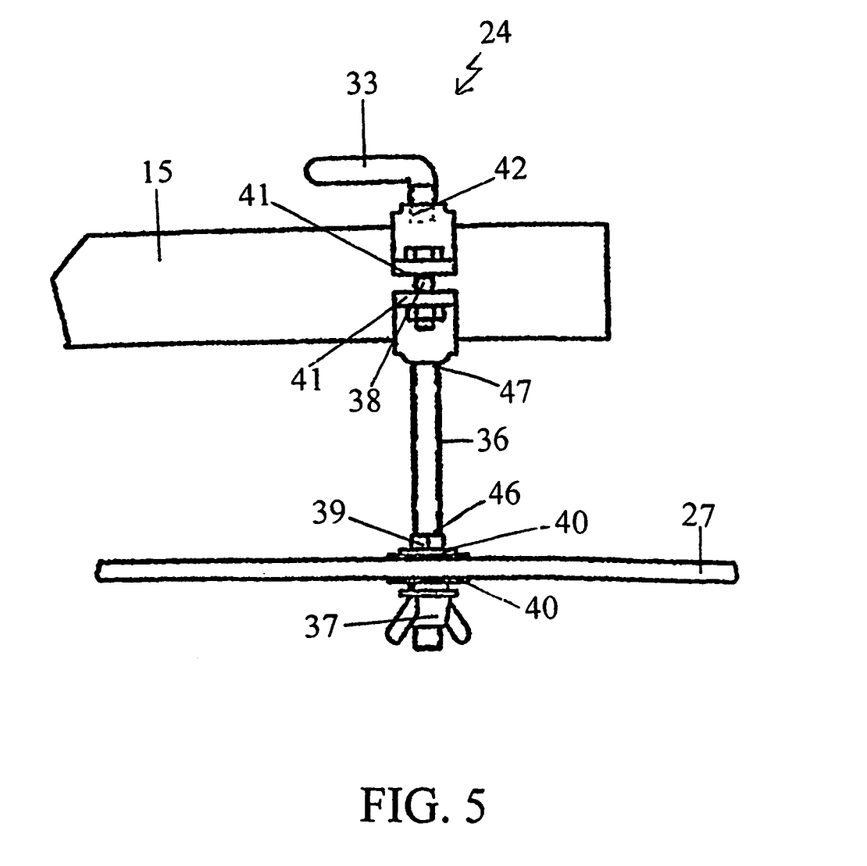
FIG. 5 is a side elevational view of a hanger mechanism of the plumb device according to FIG. 4.

When the split hanger clamp 35 is not bolted down, it is slidable along the length of the swing arm 15. This allows the suspended template portion 12 to hang closer to the base pole 14 or farther from the base pole 14. This is useful, for example, where the construction site is restricted or congested and the column must be built close to the base pole. It is also useful for building two freestanding columns close together using the one plumb device 10 with its swinging arm 15, or for building very high freestanding columns, where the swing arm 15 has also been reversed.

Continuing with FIGS. 2 and 5, when the user turns the L-shaped hanger tightening handle 33, the bottom end 42 of the hanger tightening handle 33, which extends through a hole in the upper hanger clamp piece, presses down against the base pole 15, which wedges the split hanger clamp 35 on the base pole 15 so that the suspended template portion 12 is less likely to wobble. The suspended template portion 12 must be stable so the column built using it ends up square and plumb. If desired, the user can turn the hanger tightening handle 33 in an opposite direction so that the bottom end 42 of the hanger tightening handle 33, which extends through a hole in the upper piece of the split hanger clamp 35, releases its pressure on the base pole 15.

As seen in FIGS. 2 and 5, the split hanger clamp 35 is preferably comprised of two matching pieces, upper and lower, with hanger clamp split wings 41 that are bolted to one another on opposite sides of the swing arm 15 using hanger bolts 38 or the like. In addition to the split hanger clamp 35, the hanger mechanism 24 includes the hanger rod 36, which extends down from the bottom of the split hanger clamp. The lower end portion 46 of the hanger rod 36 extends through a hanger hole 34 in the center of the upper template 27, with a hanger tightening nut 39 screwed over the lower end portion 46 of the hanger rod 36 above the upper template 27, and one or two hanger washers 40 between the hanger tightening nut 39 and the upper template 27. The surfaces of the hanger washers 40 have been roughened so that they do not slide around on the upper template 27.

Under the upper template 27, a hanger wing nut 37 is screwed onto the threaded lower end portion 46 of the hanger rod 36, preferably with a hanger lock washer 40 (with a roughened surface) between the hanger wing nut 37 and the upper template 27 to help keep it stable. The hanger wing nut 37 importantly permits the position of the templates to be adjusted. If the hanging templates 27, 28 are not square with the intended position of the column 16, before the first brick is laid, the hanger wing nut 37 is loosened and the upper template 27 is pivoted to the desired position, then the hanger wing nut 37 is tightened. The lower template 28, which is suspended from the guide lines 29, pivots with the upper template 27. If the guide lines 29 are followed, the resulting column 16 will be square and plumb, with accurate measurements.

The substantially L-shaped swing arm 15 includes a long leg 25 and an adjacent short leg 26. The long arm leg 25 is substantially at a right angle to the short arm leg 26, with a curve rather than a sharp angle in between. In the plumb device 10 of FIG. 1, the short leg 26 of the swing arm 15 extends vertically into the upper end 18 of the base pole 14, while the long leg 25 extends out substantially horizontally.

Importantly, the position of the reversible swing arm 15 can be reversed so that the free, second end 20 of the long leg 25 of the swing arm 15 extends vertically into the upper end 18 of the base pole 14, while the short leg 25 extends out substantially horizontally, as seen in FIG. 11. (The hanger mechanism 24 is then at the formerly first end 19 of the swing arm 15.) This raises the height of the suspended template portion 12, so that a very tall column 16 can be constructed (e.g., about ten feet in height). This is done in advance of building the freestanding column by: 1) loosening the split hanger clamp 35 and removing the hanger mechanism 24 with the suspended template portion 12 from the swing arm 15 and setting it aside temporarily; 2) removing the swing arm 15 from the base pole 14 entirely, swinging the swing arm 15 around, and placing the free, second end 20 of the long leg 25 of the swing arm 15 into the upper end 18 of the base pole 14; and 3) placing the split hanger clamp 35 of the hanger mechanism 24 on the first end 19 of the swing arm 15, with the suspended template portion 12 still hanging from the hanger mechanism 24.

Thirdly, the plumb device 10 includes the suspended template portion 12, which hangs like a birdcage from the hanger mechanism 24. The suspended template portion 12 includes: (1) an upper template 27; (2) a same-sized, removable lower template 28 below, substantially parallel to, and spaced apart from the upper template 27; and (3) a number of vertical guide lines 29, each extending between a corner 30 of the upper template 27 and a corresponding corner 30 of the lower template 28. Each corner 30 of the lower template 28 holds an associated line attachment device 32. The line attachment device 32 is attachable to a corresponding attachment device on a lower end 54 of each guide line 29. When the guide lines 29 are attached, the templates 27, 28 are suspended from the hanger mechanism 24, one below the other. The lower template 28 hangs from the guide lines 29 until the process of building the column commences.

The upper and lower templates 27, 28 are preferably the same size as, and made of the same lightweight, waterproof material as, one another. The templates 27, 28 are preferably made of 3/16 inch plywood coated with polyurethane. The tops of different shaped templates 27, 28 are depicted in FIGS. 7-12, such as the square shaped template of FIGS. 7 and 11, the substantially L-shaped template of FIGS. 8 and 12, the substantially T-shaped template of FIG. 9, and the octagonal template of FIG. 10. The template 27, 28 preferably is a shape with corners. The template shape is less preferably one without corners, such as a circle. The template preferably has substantially planar upper and lower surfaces. The template is cut according to the desired shape of the column to be built (cross-section or top plan view of the column).

To bring the suspended template portion 12 closer to the base pole 14, the user unbolts the hanger clamp bolts 38 and slides the hanger clamp 35 back along the swing arm 15. Since the upper template 27 is attached beneath the hanger mechanism 24, the templates 27, 28 slide along with the hanger clamp 35. Where mirror image templates are desired for building a second mirror image column 16, the hanger clamp is loosened in the same manner, turned 180 degrees, and replaced on the pole 15.

The number of guide lines 29 a particular plumb device 10 has depends on the number of corners 30 the template has. An upper end of each guide line 29 is permanently attached to one corner 30 of the upper template 27, preferably permanently. A first end of each guide line 29 is removably attached to a line attachment device 32 on a corresponding corner 30 of the lower template 28.

If the thin guide lines 29 become damaged, they can be changed out. The guide lines 29 are preferably made of string or cord. The taller the base pole 14 and the substantially vertical leg 25, 26 of the swing arm 15 are, the longer the guide lines 29 are, since both the base plate 13 and the lower template 28 contact the ground as the plumb device 10 is being set up.

The plumb device 10 drops four or more guide lines 29 at one time, which saves time and automatically squares the column 16 if the guide lines 29 are followed. Since all (four, six, or eight) sides of the column being built can be seen at once, the plumb device 10 provides "3-D plumbing". If the column is leaning, it is easier to see which corner of the column is the culprit using the present device 10. The plumb device 10 is particularly helpful where the column to be built has an L-shaped, T-shaped, or octagonal cross-section. Four, six, eight, or more guide lines 29 can be dropped at the same time using the plumb device 10. Various shaped columns can be built using the plumb device 10.

Figure 8:
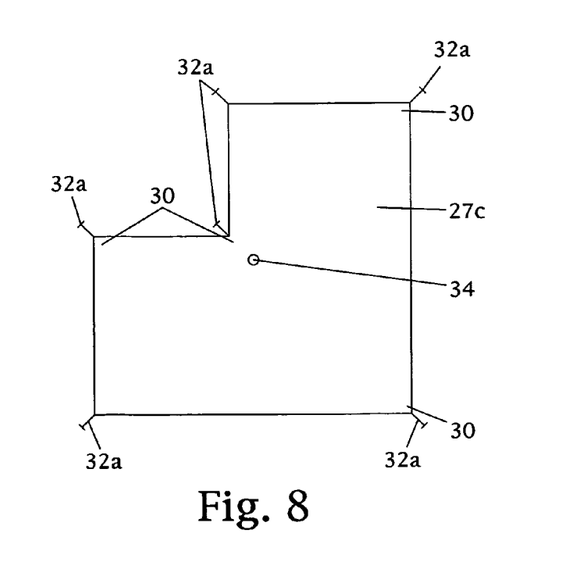
FIG. 8 is a top plan view of an L-shaped upper template of a plumb device according to the present invention.
Figure 9:
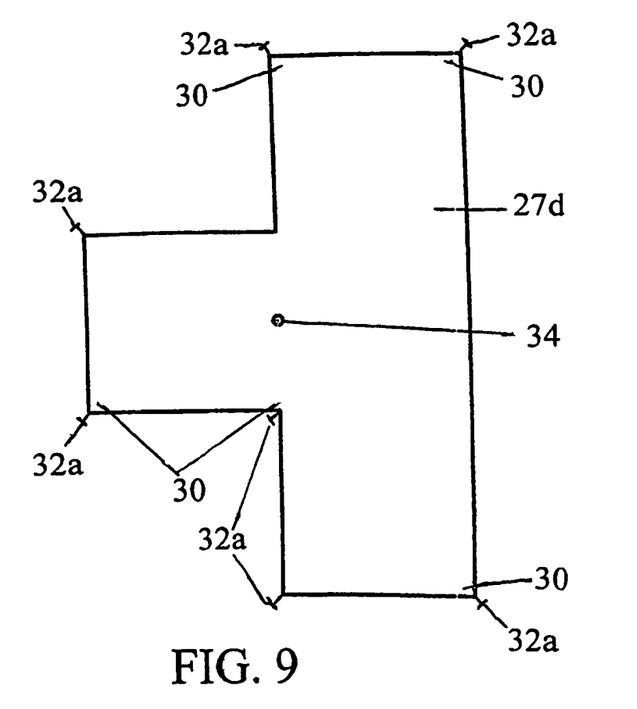
FIG. 9 is a top plan view of a T-shaped upper template of a plumb device according to the present invention.
Figure 10:
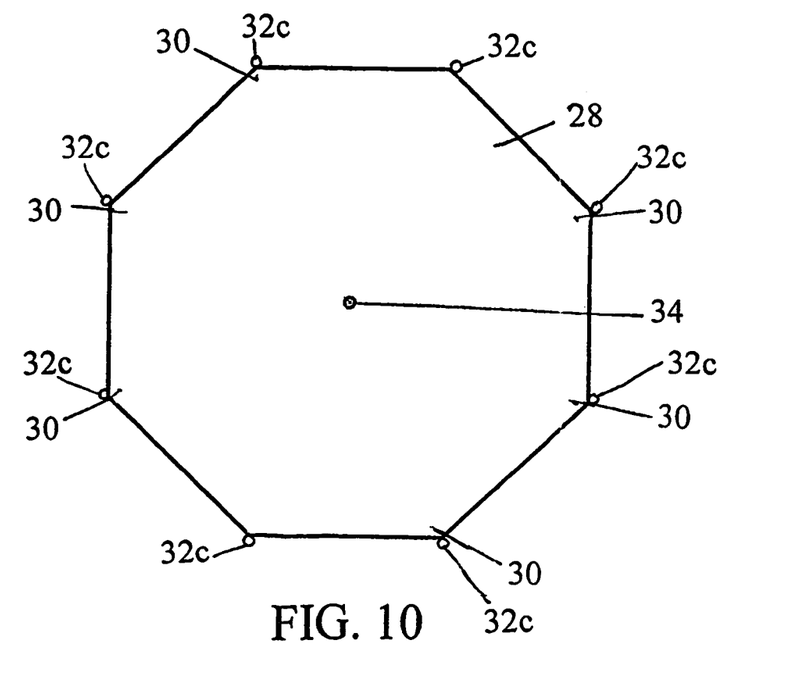
FIG. 10 is a top plan view of an octagonal lower template of a plumb device according to the present invention.

As seen in FIG. 4, the lower ends 54 of the vertical guide lines 29 have line loops 45 or other means of detachable attachment to the line attachment device 32 on the lower template 28. In the plumb device 10 of FIG. 4, the line attachment device 32 is a hook 32b on each corner 30 of the lower template 28. The line attachment device 32 is preferably one headed nail 32a (i.e., a nail with a head), line hook 32b, or eyelet 32c (with a screw base) per template corner 30. The looped ends of the guide lines 29 in the plumb device 10 shown in FIG. 8 are each looped over a corresponding nail 32a partially nailed in the side of the lower template 28. Preferably, the shafts of the nails 32 are each partially nailed into the side of the template corners 30 on each template. Alternatively, the lower end of each guide line 29 carries a hook that is removably attachable to an eyelet on a corresponding corner of the lower template 28. The eyelet 32c is alternatively screwed partway into the upper surface of the lower template 28 in the template corners 30, with the lower end 54 of the guide line 29 being removably attached to the eyelet. The guide lines 29 are preferably permanently attached to the upper template 27, but removably attached to the lower template 28, so that the lower template 28 can be removed just before construction on the column begins.

Once the plumb device 10 is in place at the construction site, the height of the pole assembly (pole 14 plus whichever leg 25, 26 of the swing arm 15 is vertical) is finely adjusted until the lower template 28 touches the ground directly under the upper template 27. Once the loops 45 on the lower ends 54 of the guide lines 29 of the plumb device 10 of FIG. 4 are attached to the hooks 32b (shown unhooked for purposes of illustration), the pole adjustment mechanism 22 will be used to lower the height of the pole assembly until the lower template 28 of FIG. 4 rests on the ground 49 or on a cement pad 48, or footing. The cement pad 48 on which the column 16 is built is laid on the ground 49 ahead of time (see FIG. 6). If the lower template 28 is blowing in the wind, a small weight can be placed on the lower template 28, if desired.

Once the lower template rests on the cement pad 48 or ground 49, the outer edges of the lower template 28 are traced on the ground 49 or cement pad 48 using any suitable marker. The loops 45, knots, hooks, or other attachment means on the lower ends 54 of the guide lines 29 are all detached from the line attachment devices 32, such as hooks or nails (with heads), on the corners 30 of the lower template 28, and the lower template 28 is removed. The lower ends 54 of the guide lines 29 are temporarily tied up, or the upper template 27 with its attached guide lines 29 is moved out of the way, while a first course of bricks is laid down inside the template outline. The outline is used as a pattern for laying the bricks. Alternatively, a layer of mortar under a first course of bricks is laid down inside the template outline. As a check, the lower template 28 is preferably laid on top of the first course to check for accuracy before the mortar hardens. Any brick not in alignment is immediately properly aligned with the lower template. The lower template 28 is removed and stored for later use.

Each lower line end 54 is then placed under a corresponding corner of a corner brick 31, or in the mortar under each corner brick 31 in the first course. The corner bricks 31 optionally each have an angled cut 55 or hook at their outer, lower corners to facilitate attachment of the lower line ends 54. If not, a lower line end 54 can simply be tucked under each corner brick 31. Full construction on the column then commences.

Using the guide lines 29 as guides, the second course of bricks is laid, and so forth, always keeping the corner of each corner brick 1/16 inch from the guide line 29. It has been found herein that a brick resting on a guide line 29 can bow the guide line 29, which can result in a crooked column.

The process is repeated, laying each corner brick 31 of each course first so as to ensure trueness and accuracy throughout construction until the column reaches the desired height. Once that occurs, the lower end 54 of each guide line 29 is detached from its position under or on the corner bricks 31 of the first course. The plumb device 10 is then removed. Ordinarily, the plumb device 10 is removed by detaching the upper template 27 with the guide lines 29 attached to it, and storing it, then swinging the swing arm 15 away and detaching it from the base pole 14. The parts of the plumb device 10 are then stored until the next use.

When the supporting column has been built almost as high as the upper template 27, the template hanger mechanism 51, upper template 27, and guide lines 29 are easily removed. The last course or two of bricks is then laid, so that the top of the supporting column reaches the beam 52 and is load-supporting. Since the plumb device 10 has been employed, the resulting supporting column will be square and plumb.

The plumb device 10 is easy to use, and does not have multiple complicated moving parts that are likely to snag or break. The inexpensive guide lines 29 are thin and flexible and not rigid, and can easily be replaced. The plumb device 10 does not include any frame that must be moved along the brick and mortar column. The plumb device 10 does not include any parts, such as rods, screws, and brackets, that must be affixed to or inserted between the bricks of the column that could leave behind holes or chinks in the bricks. The plumb device 10 does not require, and preferably does not include, hinges or magnets. Since the freestanding base suspension portion 11 of the plumb device 10 is some distance away from the column site, it does not block the backside of the column, and all sides of the column are exposed to the masons. Columns with many different sizes and shapes can be built using the plumb device 10 by cutting and including new templates in the plumb device 10. These are all also true of the template device 50.

Figure 13:
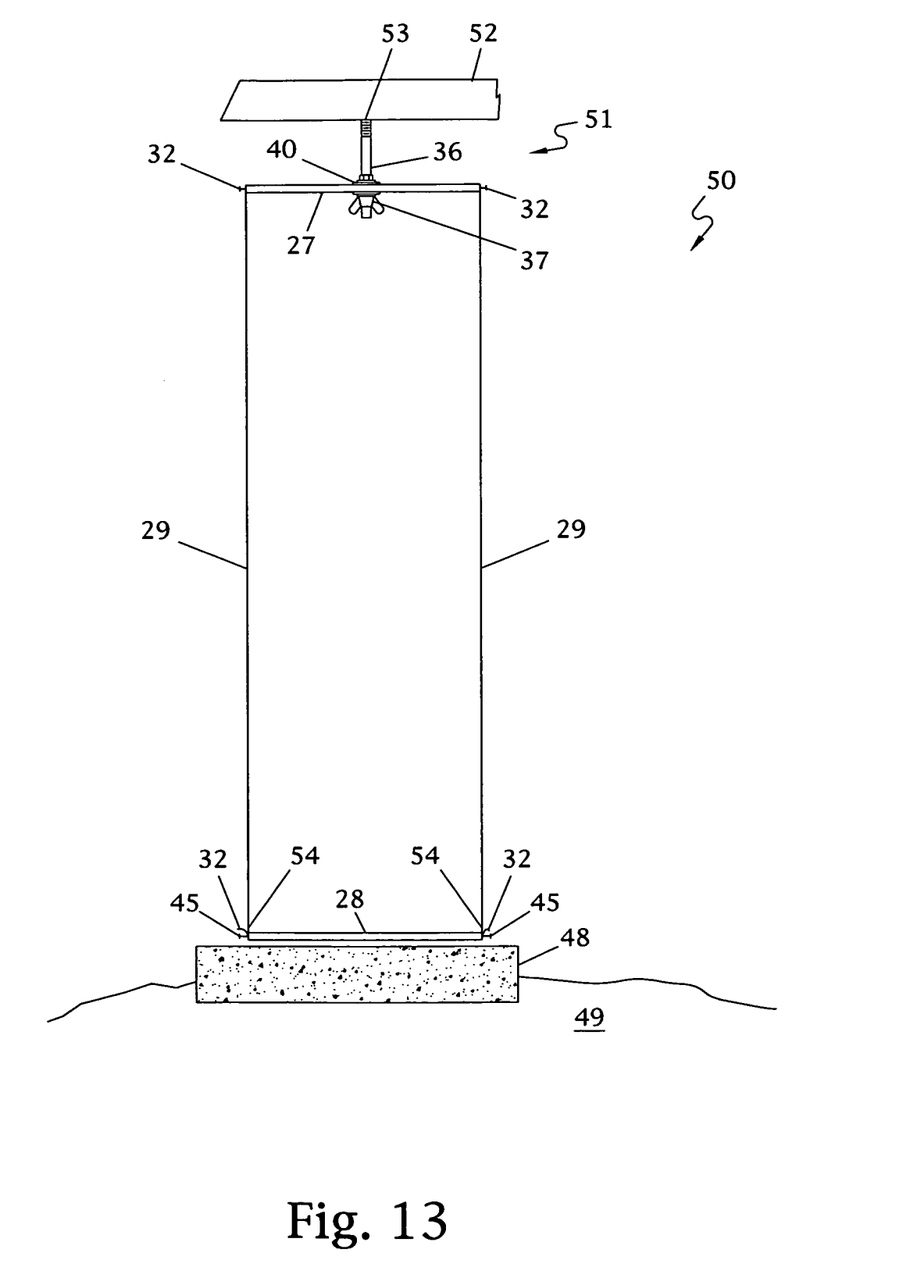
FIG. 13 is a front elevational view of a template device according to the present invention, shown on a beam of a building.
Figure 14:
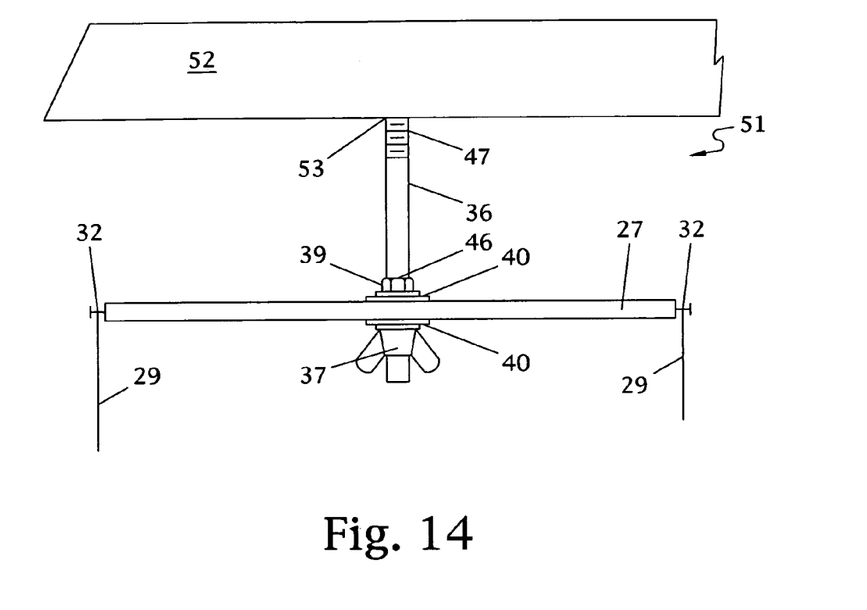
FIG. 14 is a front elevational view of a template hanger mechanism of the template device according to FIG. 13.

Also included herein is a template device 50 for use in erecting a column 51 that is not freestanding, which is called a supporting column here. As seen in FIGS. 13 and 14, the template device 50 includes the template hanger mechanism 51. The template device 50 is suspended from the template hanger mechanism 51 over the area where the supporting column is to be built. The template device 50 can be suspended from a beam 52, eave, or the like of an adjacent building, such as a house or shed, or from any suitable overhead structure, prior to starting construction on the supporting column. Once the supporting column is nearly finished, the template device 50 is removed and stored for later reuse.

The template device 50 comprises: (1) the upper template 27; (2) the removable lower template 28 below and spaced apart from the same-sized upper template 27; (3) guide lines 29, each extending between a corner 30 of the upper template 27 and a corresponding corner 30 of the same-sized lower template 28, each corner 30 of the upper and lower templates 27, 28 including a line attachment device 32, a lower end 54 of each guide line 29 comprising a corresponding attachment device 45; and (4) the template hanger mechanism 51. The template device 50 is suspended over the area where the supporting column will be constructed.

An upper end of each of the guide lines 29 is attached to a line attachment device on the upper template 27. The line attachment devices 32 are adjacent the corners 30 of the template 27, 28. They are preferably nails that have been partially affixed in a side of the template 27, 28 adjacent a corner 30 of the template. A lower end 54 of each of the guide lines 29 comprises a corresponding attachment device 45, preferably a knot or loop, that is removably attachable around the head of the nail 32.

Continuing with FIGS. 13 and 14, the template hanger mechanism 51 includes the hanger rod 36, the hanger adjustment wing nut 37, and a beam attachment device 53. The hanger rod 36 has a lower rod end portion 46 that extends through a hole 34 in a center of the upper template 27 hanger hole 34 in the center of the upper template 27, with a threaded hanger tightening nut 39 screwed over the lower end portion 46 of the hanger rod 36 above the upper template 27, and one or two hanger washers 40 between the hanger tightening nut 39 and the upper template 27. The surfaces of the hanger washers 40 have been roughened so that they do not slip around on the upper template 27.

The upper rod end 47 of the hanger rod 36 is attached to the beam attachment device 53. The beam attachment device 53 is preferably a wood screw.

Under the upper template 27, a hanger wing nut 37 is screwed onto the threaded lower end portion 46 of the hanger rod 36, preferably with a hanger washer 40 (with a roughened surface) between the hanger wing nut 37 and the upper template 27 to protect the template material. The hanger wing nut 37 importantly permits the position of the templates to be adjusted. If the hanging templates 27, 28 are not square with the intended position of the column, before the first brick is laid, the hanger wing nut 37 is loosened and the upper template 27 is pivoted to the desired position, then the hanger wing nut 37 is tightened. The lower template 28, which is suspended from the guide lines 29, pivots with the upper template 27. If the guide lines 29 are followed, the resulting column will be square and plumb, with accurate measurements.

To use the template device 50 after attaching the lower line attachment devices 45 on the lower ends 54 of the guide lines 29 to the corresponding line attachment devices 32 on the lower template 28, and hanging the template device 50 from the beam 52 over the intended site of the supporting column, the user uses the template hanger mechanism 51 to raise or lower the height of the template device 50 until the lower template 28 contacts the cement pad 48, or ground 49, directly under the upper template 27. For example, the hanger tightening nut 39 and the hanger wing nut 37 are tightened, pushing the upper template 27 between them up, which raises the lower template 28, or the hanger wing nut 37 is loosened, allowing the upper template 27 to drop by gravity, which has the effect of lowering the lower template 28.

The edges of the lower template 28 are then traced on the cement pad 48 or ground 49 using any suitable marker. The lower ends 54 of the guide lines 29 are all detached from the line attachment device 32, such as hooks or nail heads, on the corners 30 of the lower template 28, and the lower template is removed. The lower ends 54 of the guide lines 29 are temporarily tied up, or moved out of the way, while a first course of bricks is laid down inside the template outline. The outline is used as a pattern for laying the bricks. Alternatively, a layer of mortar under a first course of bricks is laid down inside the template outline. As a check, the lower template 28 is preferably laid on top of the first course to check for accuracy before the mortar hardens. Any brick not in alignment is properly aligned with the lower template. The lower template 28 is removed and stored for later use.

Figure 6:
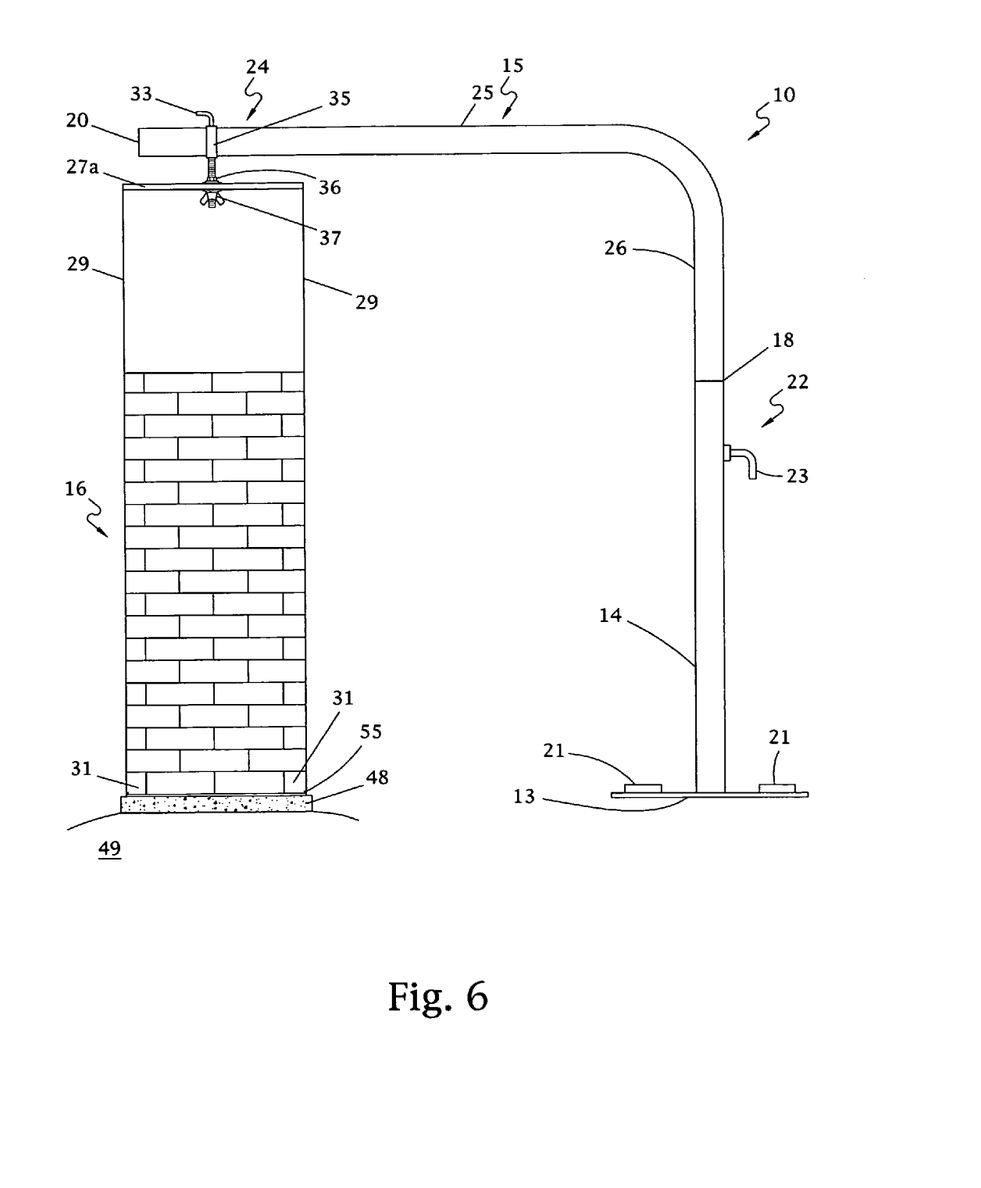
FIG. 6 is a side elevational view of a plumb device according to the present invention, shown in use.

Each lower line end 54 is then placed under a corresponding corner of a corner brick 31, or in the mortar under each corner brick 31 in the first course. As depicted in FIGS. 6 and 11, the corner bricks 31 optionally each have an angled cut 55 or hook at their outer, lower corners to facilitate attachment of the lower line ends 54. If not, a lower line end 54 can simply be tucked under each corner brick 31. Full construction on the column then commences.

When the supporting column has been built almost as high as the upper template 27, the template hanger mechanism 51, upper template 27, and guide lines 29 are removed. The last course or two of bricks is then laid, usually so that the supporting column reaches the beam 52 and is load-supporting. The resulting column is square and plumb.

The template device 50 avoids the necessity of climbing up and down a ladder to drop multiple plumb lines from the beam 52 or another overhead location, and having to try and figure out whether the column will be square in the end. The old way of doing it was labor intensive, often with inconsistent results. Where the supporting column is T-shaped, L-shaped, or octagonal in cross-section (or top view), for example, six or eight plumb lines would have to be dropped.

The term "brick" herein is meant to include any types of conventional bricks as well as any brick-type units, such as blocks. The columns made using the plumb device 10, or the template device 50, are made of brick or any similar materials.

From the foregoing it can be realized that the described device of the present invention may be easily and conveniently utilized as a plumb device for laying freestanding columns or as a template device for constructing plumb supporting columns. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

BRIEF LIST OF REFERENCE NUMBERS USED
IN THE DRAWINGS 10 plumb device
11 base suspension portion
12 suspended template portion 13 base plate
14 base pole
15 swing arm
16 brick column
17 lower pole end
18 upper pole end
19 first arm end
20 free, second arm end
21 base weights
22 pole adjustment mechanism
23 height adjustment handle
24 hanger mechanism
25 long leg of swing arm
26 short leg of swing arm
27 upper template
28 lower template
29 guide lines
30 template corners
31 corner brick
32 line attachment device
33 hanger tightening handle
34 template hole
35 hanger clamp
36 hanger rod
37 hanger wing nut
38 hanger clamp bolt
39 hanger tightening nut
40 hanger washers
41 hanger clamp split wings
42 bottom end of handle
43 bottom leg of handle
44 pole tightening screw
45 line lower end attachment device
46 lower end portion of hanger rod
47 upper end of hanger rod
48 cement pad
49 ground
50 suspended template device
51 template hanger mechanism
52 beam of building
53 beam attachment device
54 lower end of guide line
55 angled cut in corner brick

What is claimed is:

1. A device for constructing plumb freestanding brick columns, the plumb device comprising:
  (a) a base suspension portion comprising: a base, a substantially vertical base pole supported on the base, and a swing arm movably attached to an upper end of the base pole;
  (b) a hanger mechanism, comprising a hanger rod comprising a lower end portion connected through a center of the upper template, and a hanger adjustment wing nut affixed to the lower end portion of the hanger rod below the upper template, an upper end of the hanger rod being attached to a hanger clamp, the hanger clamp being affixable around the swing arm; and
  (c) a suspended template portion comprising: (1) an upper template; (2) a removable lower template below and spaced apart from the upper template, the upper template being the same size as the lower template; and (3) a plurality of vertical guide lines, each guide line extending between a corner of the upper template and a corresponding corner of the lower template, each corner of the lower template comprising a line attachment device attachable to a corresponding attachment device on a lower end of each guide line.

2. The plumb device according to claim 1, wherein the swing arm is substantially L-shaped and reversible.

3. The plumb device according to claim 2, wherein the swing arm comprises a long leg and an adjacent short leg, the long leg of the swing arm being substantially at a right angle to the short leg of the swing arm, the swing arm being rotatable through a 360 degree circle around the base pole.

4. The plumb device according to claim 3, wherein one cylindrical end of the swing arm telescopes into a hollow, cylindrical upper end portion of the base pole, the cylindrical end of the swing arm being rotatable in the cylindrical upper end portion of the base pole.

5. The plumb device according to claim 3, wherein a cylindrical upper end portion of the base pole telescopes into a hollow, cylindrical end of the swing arm, the cylindrical end of the swing arm being rotatable on the upper end portion of the base pole.

6. The plumb device according to claim 1, wherein the lower end portion of the hanger rod extends through a hole in a center of the upper template, the lower end portion of the hanger rod being threaded, a hanger tightening nut being affixed to the lower end portion of the hanger rod above the upper template.

7. The plumb device according to claim 1, wherein the hanger clamp is a split hanger clamp that is removably affixable around the swing arm.

8. The plumb device according to claim 1, wherein the lower end of each of the guide lines comprises a loop or knot.

9. The plumb device according to claim 8, wherein the line attachment devices are a plurality of hooks, one of the plurality of hooks being attached to each corner of the upper template and one attached to each corner of the lower template in a side or upper surface of the templates, each loop being removable attachable over each of the plurality of hooks.

10. The plumb device according to claim 9, wherein the upper and lower templates are each substantially rectangular in shape, with a nail affixed to each of the four corners of the upper template and the four corners of the lower template.

11. The plumb device according to claim 1, wherein the line attachment device is a headed nail partially affixed in a side of the lower template at a corner of the lower template.

12. The plumb device according to claim 1, wherein the templates are substantially L-shaped or T-shaped.

13. The plumb device according to claim 1, wherein the hanger mechanism further comprises a hanger tightening nut on the hanger rod adjacent at least one hanger washer above the upper template.

14. The plumb device according to claim 1, further comprising a pole adjustment mechanism comprising a height adjustment handle and a pole tightening screw, a bottom end of the height adjustment handle extending through a hole in the base pole.

15. The plumb device according to claim 1, wherein the upper and lower templates are each substantially octagonal in cross-section.

16. The plumb device according to claim 1, wherein the line attachment device is an eyelet screw comprising a screw portion that is affixed in a side of the lower template at a corner of the lower template.

17. A template device for constructing a brick plumb supporting column, the template device comprising: (1) an upper template; (2) a removable lower template below and spaced apart from the same-sized upper template; (3) a plurality of guide lines, each guide line extending between a corner of the upper template and a corresponding corner of the same-sized lower template, each corner of the upper and lower templates comprising a line attachment device attachable to a corresponding attachment device on a lower end of each guide line; and (4) a template hanger mechanism comprising a hanger rod, the hanger rod comprising a lower end portion extending through a hole in a center of the upper template, a hanger adjustment wing nut being affixed to the lower end portion of the hanger rod below the upper template, an upper end of the hanger rod being attached to a beam attachment device; wherein the template device is suspended over a site of the column to be constructed.

18. The template device according to claim 17, wherein the hanger mechanism further comprises a hanger tightening nut on the hanger rod adjacent at least one hanger washer above the upper template.

19. The template device according to claim 17, wherein an upper end of each of the guide lines is attached to a side of the upper template at each corner of the upper template.

20. The template device according to claim 17, wherein the line attachment device is a nail partially affixed in a side of the lower template at a corner of the lower template, a lower end of each of the guide lines comprising a loop that is removably attachable to the nail.

\* \* \* \* \*